United States Patent [19]
Godden

[11] 3,845,326

[45] Oct. 29, 1974

[54] LOGARITHMIC AMPLIFICATION CIRCUIT

[76] Inventor: Walter R. Godden, 26 Nightingale Rd., Bushey, England

[22] Filed: Aug. 23, 1973

[21] Appl. No.: 390,823

[30] Foreign Application Priority Data

Sept. 1, 1972 Great Britain .................... 40584/72

[52] U.S. Cl. ..... 307/230, 178/7.3 DC, 178/7.5 DC, 307/229, 328/145, 328/151

[51] Int. Cl. .............................................. G06g 7/12

[58] Field of Search ............ 307/229, 230; 328/145, 328/151; 178/7.3 DC, 7.5 DC; 340/146.3 R

[56] References Cited

UNITED STATES PATENTS

| | | | |
|---|---|---|---|
| 3,207,998 | 9/1965 | Corney et al. | 178/7.3 DC |
| 3,415,950 | 12/1968 | Bartz et al. | 328/147 |
| 3,543,169 | 11/1970 | Hill | 328/151 |
| 3,624,409 | 11/1971 | Folsom et al. | 307/229 |
| 3,626,092 | 12/1971 | Wilson | 328/145 |
| 3,793,480 | 2/1974 | Waehner | 307/230 |

OTHER PUBLICATIONS

"Logarithmic Amplifier Uses FGT" Electronic Industries Aug. 1965 p. 168.

*Primary Examiner*—Stanley D. Miller, Jr.
*Attorney, Agent, or Firm*—W. F. Noval

[57] ABSTRACT

A logarithmic amplification circuit which includes a logarithmic transfer circuit which produces a video output voltage which is a logarithmic function of a video input voltage and which also includes a feedback circuit which samples the video output voltage during the horizontal blanking interval, compares the sampled voltage to a reference voltage and develops an error correction signal which is fed back to the input of the logarithmic transfer circuit and which is applied during the horizontal blanking interval to correct the black level of the video input signal. The logarithmic transfer circuit includes a bipolar transistor connected in the common emitter configuration and a field effect transistor having its gate and source respectively connected to the collector and base of the bipolar transistor. A current source converts a video input voltage to a corresponding video input current which is applied to the logarithmic transfer circuit. The feedback circuit includes a field effect transistor which is gated on during the horizontal blanking interval to sample the black level of the video output signal; a capacitor which stores the sampled voltage; a differential amplifier which compares the sampled voltage with a reference voltage and develops an error correction signal which is stored on a black level storage capacitor; and a field effect transistor which is gated during the horizontal blanking interval to clamp the black level of the video input voltage to the level on the black level storage capacitor.

12 Claims, 3 Drawing Figures

LOGARITHMIC AMPLIFICATION CIRCUIT

BACKGROUND OF THE INVENTION

1. Field of the Invention

This invention relates to a logarithmic amplification circuit and more particularly to a video signal logarithmic amplification circuit which is operable over a wide range of input signal levels and input frequencies and which corrects the black level of the video signal during each horizontal blanking interval as a function of a comparision of a sampled black level voltage with a reference voltage.

2. Description of the Prior Art

Logarithmic amplification circuits are widely used in applications employing video techniques. In one such application, a photographic original such as negative or transparency film is scanned by means of a cathode ray tube flying spot scanner to develop by means of a photoelectric transducer a video voltage signal which is a function of the density or transmittancy of the photographic original scanned. The video signal is then processed to effect desired corrections and is applied to a second flying spot scanner which scans photosensitive material to produce a print of the photographic original. Since nonlinearities may be introduced into the video signal by the cathode ray scanning tubes and the signal processing circuits, it is known to use a logarithmic amplification circuit to correct for such nonlinearities. A known wide band, wide input range logarithmic amplifier for use in controlling tone in electronic photographic reproduction apparatus is disclosed in British Pat. No. 1,251,797. In addition, in conventional color video systems for reproduction from photographic film, logarithmic amplifiers may be used for gamma correction and for electronic masking to correct for deficiencies in the film dyes. Logarithmic amplifiers for such uses are described in an article by R. P. Burr in Proceedings of the Institute of Radio Engineers, Vol. 42, No. 1, January, 1954, Pages 19–200 and in an article entitled, "COLOUR FILM FOR COLOUR TELEVISION," by C. B. B. Wood and F. A. Griffiths in British Kinematography, Vol. 48, No. 3 1966, Pages 73–80.

In general it is desirable to provide in video photographic reproduction apparatus, a logarithmic amplification circuit which operates over a wide range of input voltages and over a wide range of input frequencies. It is also desirable that the logarithmic amplification circuit be simple in construction, efficient in operation and be unaffected by loading imposed by circuitry subsequent to the logarithmic circuit. It is also desirable that the black level of the video signal be corrected during each horizontal line scan so that faithful reproduction of the photographic originals may be effected in the photosensitive print material.

SUMMARY OF THE INVENTION

It is thus an object of the present invention to provide a logarithmic amplification circuit which is simple, efficient, and economical.

It is a further object of the present invention to provide a logarithmic amplification circuit which is capable of operating over a wide range of input signals and over a wide range of input frequencies.

It is still a further object of the present invention to provide a logarithmic amplification circuit having high input impedance and a low output impedance wherein the loading imposed by subsequent circuits will have a minimal effect on the performance of the logarithmic amplification circuit.

It is yet another object of the present invention to provide a logarithmic amplification circuit for processing video signals wherein the black level of the video signal is corrected during the blanking interval of each horizontal line scan.

In general, according to the present invention a logarithmic amplification circuit is provided for use in video photographic reproduction apparatus comprising a logarithmic transfer circuit having a high input impedance and a low output impedance and a feedback circuit for correcting the black level of the input signal during the horizontal blanking interval of the video signal. According to one aspect of the invention the logarithmic transfer circuit includes a bipolar transistor connected in common emitter configuration and a field effect transistor having its gate and source respectively connected to the collector and base of the bipolar transistor. According to another aspect of the invention a video input voltage signal is converted to a current signal by means of a current source which supplies current to the junction of the gate of the field effect transistor and the collector of the bipolar transistor of the logarithmic transfer circuit. According to another aspect of the present invention a feedback circuit samples the black level video output voltage of the logarithmic transfer circuit during the horizontal blanking interval, compares the sampled voltage with a reference voltage in a differential amplifier to produce a black level correction voltage, stores the correction voltage on a capacitor, and applies the stored voltage during the horizontal blanking interval to the video input voltage to correct the black level of the video input signal.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE PREFERRED EMBODIMENT

Because photographic reproduction apparatus are well known, the present description will be directed in particular to elements forming part of, or cooperating more directly with, the present invention, apparatus not specifically shown or described herein being understood to be selectable from those known in the art.

Figure 1:
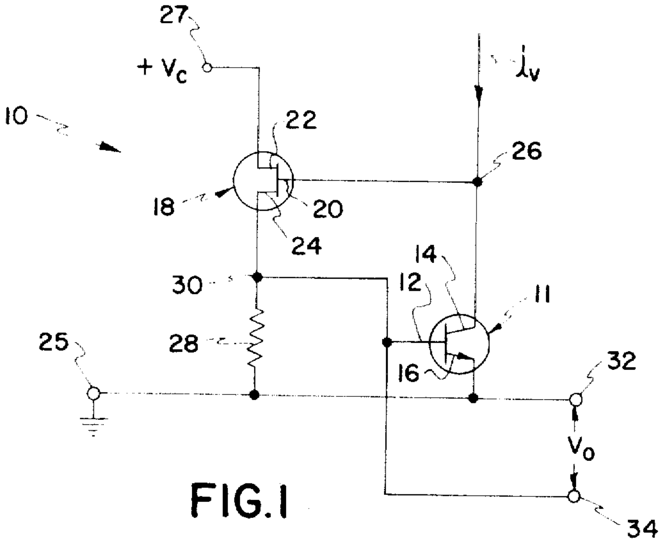
FIG. 1 is a schematic electrical diagram of a logarithmic transfer circuit which may be used in the logarithmic amplification circuit of the present invention.

Referring now more particularly to the figures there is shown a preferred embodiment of logarithmic amplification circuit according to the present invention. In FIG. 1 there is shown a schematic electrical diagram of a preferred logarithmic transfer circuit 10 which may be used in the logarithmic amplification circuit of the present invention which will be more completely described hereafter with respect to FIGS. 2 and 3. Logarithmic transfer circuit 10 includes bipolar transistor 11 having a base 12, a collector 14, and an emitter 16 and field effect transistor 18 having a gate 20, a drain 22 and a source 24. Emitter 16 of transistor 11 is connected to ground terminal 25, collector 14 of transistor 11 and gate 20 of transistor 18 are connected together at junction 26 and base 12 of transistor 11 and source 24 of transistor 18 are connected together. Drain 22 of transistor 18 is connected to positive supply voltage $+V_c$ terminal 27. A resistor 28 is connected between ground and the junction point 30 between drain 24 of transistor 18 and gate 12 of transistor 11. Output voltage $V_o$ is taken across resistor 28 at terminals 32 and 34.

The operation of the circuit of FIG. 1 is as follows: There is caused to flow into junction 26, a current $i_v$ proportional to a video signal obtained for example, by scanning a photographic original to be reproduced on photosensitive print material by means of a flying spot scanner and sensing the reflected or transmitted light from the image of the photographic original by means of a phototransducer which produces the video signal. Transistor 18 operates as a source-follower having a very high input impedance, so that substantially the entire amount of current $i_v$ flows into collector 14. Transistors 11 and 18 form a feed back amplifying circuit and voltage $V_o$ is adjusted so that collector-emitter current $i_c$ is substantially equal to the input current $i_v$. The value of resistor 28 is selected to allow a suitable range of current to flow through the collector-emitter path of transistor 11.

The relationship between the collector current $i_c$ and the base-emitter voltage $V_{BE}$ of transistor 11 is expressed by the following formula:

$$i_c = Ke^{(CV_{BE}/T)}$$

where $K$ and $C$ are constants and $T$ is the temperature in degrees Kelvin.

$$\text{Thus } \log_e i_c = \log_e K + CV_{BE}/T$$

and at a constant temperature $V_{BE}$ is proportional to a constant + $\log_e i_c$.

Since $i_c$ is substantially equal to $i_v$, and $V_o$ is substantially equal to $V_{BE}$, $V_o$ is proportional to a constant + $\log_e i_v$.

Figure 2:
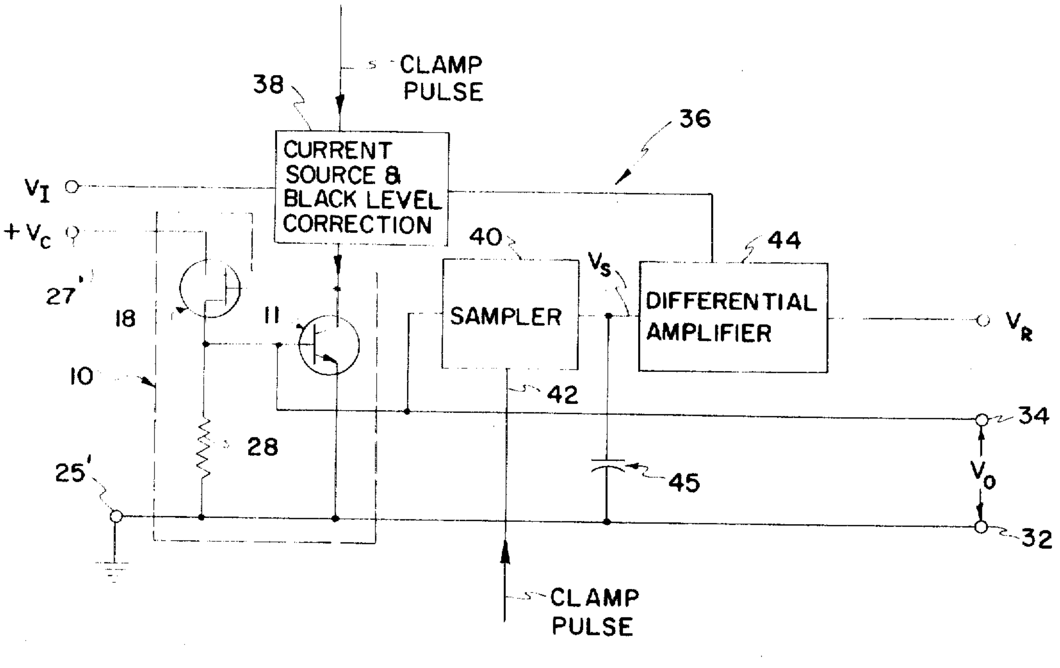
FIG. 2 is a partially schematic block diagram of a preferred embodiment of logarithmic amplification circuit according to the present invention.

Referring now to FIG. 2 there is shown a preferred embodiment of logarithmic amplification circuit according to the present invention. As shown, logarithmic amplification circuit 36 includes a logarithmic transfer circuit 10 having field effect transistor 18, bipolar transistor 11 and resistor 28 connected in the configuration shown in FIG. 1. Video input voltage $V_i$ is applied to current source and black level correction circuit 38 which converts the video input voltage into a current $i_v$ proportional thereto which is fed to logarithmic transfer circuit 10. Circuit 38 also clamps the black level of the video input signal to a predetermined level during the horizontal blanking interval of the signal through a feedback circuit to be described.

The output voltage $V_o$ of logarithmic transfer circuit 36 is sampled during the horizontal blanking interval by means of sampler 40. Sampler 40 is gated to conduction during the horizontal blanking period by means of a suitable clamp pulse applied at terminal 42 of sampler 40. The output of sampler 40 is stored in a suitable storage device such as capacitor 45. The voltage $V_S$ of capacitor 45 is compared with a reference voltage $V_R$ by a differential amplifier 44 and any difference signal is amplified and applied as an error correction signal to circuit 38.

The correction of the black level of video input voltage $V_i$ during the horizontal blanking interval thereof by means of a feedback error voltage derived from a comparison of the black level of the output voltage with a reference voltage stabilizes the black level of the video voltage to establish circuit operation on the correct path on the characteristic curve of transistor 11.

Figure 3:
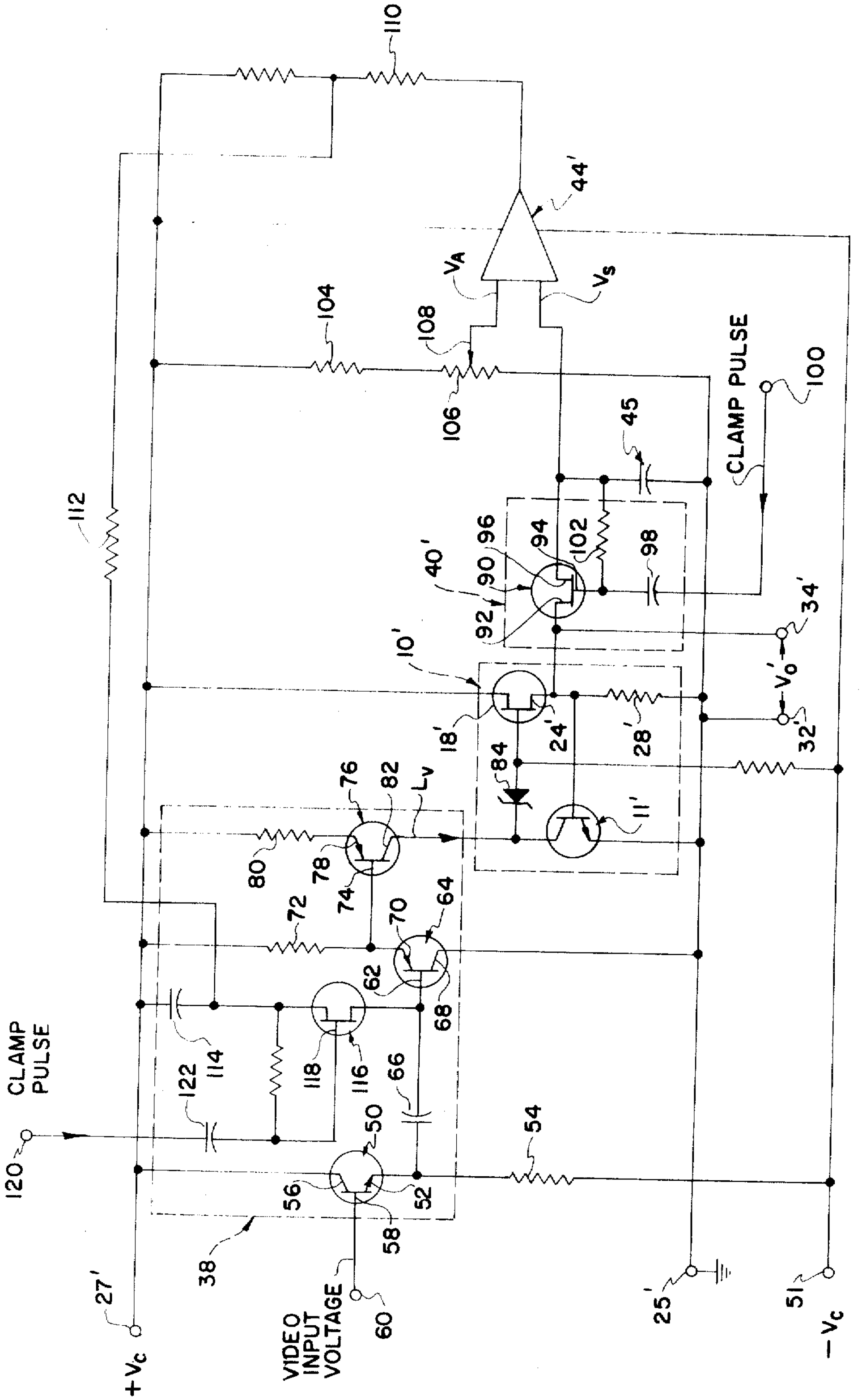
FIG. 3 is a schematic electrical diagram of the embodiment of FIG. 2.

Referring now to FIG. 3 there is shown in greater detail the circuit of FIG. 2. As shown, current source and black level correction circuit 38 includes a transistor 50 having an emitter 52 connected by means of resistor 54 to negative voltage source $-V_c$ terminal 51, a collector 56 connected to positive voltage source $+V_c$ terminal 27', and a base 58 connected to video input voltage $V_i$ terminal 60. The output of transistor 50 is connected to the base 62 of bipolar transistor 64 by means of capacitor 66, collector 68 of transistor 64 is connected to ground potential and emitter 70 of transistor 64 is connected to $+V_c$ by means of resistor 72. The output of transistor 64 taken from emitter 70 is applied to base 74 of bipolar transistor 76. Transistor 76 has an emitter 78 connected to $+V_c$ by means of resistor 80 and a collector 82 connected to logarithmic transfer circuit 10'.

As described hereinabove more particularly with respect to FIG. 1, circuit 10' includes a bipolar transistor 11', a field effect transistor 18' and a resistor 28' connected as shown. Transistor 11' is preferably placed in a constant temperature enclosure so that constant operating conditions are maintained. A zener diode 84 is provided to establish suitable working voltage conditions for transistor 11'.

The output of logarithmic transfer circuit 10' is presented at output terminals 32' and 34' and is also sampled by sampler circuit 40. Circuit 40 includes a field effect transistor 90 having a drain 92, a gate 94, and a source 96. Drain 92 is connected to source 24' of transistor 18', gate 94 is connected by means of capacitor 98 to a clamp pulse input terminal 100 and is also connected to source 96 by means of resistor 102. The output of transistor 90 is stored on storage capacitor 45 during the horizontal blanking period when a clamp pulse is applied to gate 94 to gate transistor 90 on. This sample voltage $V_s$ is applied to one of the input terminals of differential amplifier 44'. A reference voltage $V_R$, applied to the other input terminal of amplifier 44' is obtained from wiper 108 of variable resistor 106. Resistors 104 and 106 form a voltage divider chain connected between $+V_c$ and ground. Differential amplifier 44' compares the reference voltage $V_R$ with sampled voltage $V_s$ and develops and output error correction signal which is fed back via resistors 110 and 112 to circuit 38. Circuit 38 includes a black level correction circuit including black level storage capacitor 114 and field effect transistor 116 connected in series between $+V_c$ and base 62 of transistor 64. Gate 118 of transistor 116 is connected to clamp pulse input terminal 120 by means of capacitor 122.

The operation of the circuit shown in FIG. 3 is as follows:

A video input voltage $V_i$ applied at terminal 60 is applied to emitter follower transistor 50 whose output is applied through capacitor 66 to transistors 64 and 76 which convert $V_i$ into a current $i_v$ linearly related to $V_i$. The current $i_v$ is applied to logarithmic transfer circuit 10' which produces an output voltage $V_o$ which is a logarithmically related to $i_v$. The black level of output voltage $V_o$ is sampled during the horizontal blanking period by sampling transistor 90 and the sampled voltage $V_s$ is stored on storage capacitor 45. Differential amplifier 44' compares the black level sampled voltage $V_s$ to a reference voltage $V_R$ and develops an error voltage at its output which is fed back via resistors 110 and 112 to circuit 38 where it is stored on capacitor 114. Application of a clamp pulse at terminal 120 during the horizontal blanking period gates transistor 116 on and the voltage on capacitor 114 is applied to base 62 of transistor 64 to clamp the black level of the video input voltage signal to the voltage on the capacitor 114.

It will be understood that field effect transistor 18, 18' may be replaced by a bipolar transistor or a pair of bipolar transistors connected in the Darlington Configuration in order to obtain the high impedance input and low impedance output for proper operation of logarithmic transfer circuits 10, 10'.

The circuit of the present invention has been operated over a range of 60 db. of input current and over a bandwidth of input frequencies of in excess of 10 MHz.

Thus it is seen there is provided a logarithmic amplification circuit according to the present invention wherein a video input voltage signal derived through the scanning of a photographic original by means of a cathode ray tube flying spot scanner is corrected for nonlinearities by means of a logarithmic transfer circuit which converts the video input voltage signal to a video output signal which is logarithmically related to the video input voltage. The black level of the video voltage signal is corrected during the horizontal blanking interval through sampling of the video voltage during the horizontal blanking period, comparing the sample voltage to a reference voltage and developing a correction signal in a differential amplifier which is used to clamp the black level of the video signal during the horizontal blanking interval to the corrected level.

The invention has been described in detail with particular reference to preferred embodiments thereof, but it will be understood that variations and modifications can be effected within the spirit and scope of the invention.

I claim:

1. In apparatus for processing a video signal having a black level blanking interval, a logarithmic amplification circuit comprising:

input means for receiving a video input signal having a black level blanking interval;

logarithmic transfer means connected to said input means for producing a video output signal which is logarithmically related to said video input signal;

means for sampling the black level of said video output signal during a blanking interval thereof to produce a sampled black level signal;

means for comparing said sampled signal with a reference signal and for producing a correction signal as a function thereof; and means for applying said correction signal to said input means during the blanking interval of said video input signal to correct the black level of said video input signal as a function of said correction signal.

2. The circuit of claim 1 wherein said input means is adapted to receive a video input voltage signal and includes current producing means for producing a video input current signal which is linearly related to said video voltage signal, wherein said logarithmic transfer means produces a video output voltage signal which is logarithmically related to said video input current signal and including means for applying said video input current signal to said logarithmic transfer means.

3. The circuit of claim 1 wherein said logarithmic transfer means includes a bipolar transistor having a base, an emitter and a collector, said collector being connected to said input means, said collector and emitter forming a current path and further includes a source follower connected between the base and collector of said transistor.

4. The circuit of claim 3 wherein said source follower includes a field effect transistor having a source and gate respectively connected to the base and collector of said bipolar transistor.

5. The circuit of claim 4 wherein said logarithmic transfer circuit includes a resistor connected between said base of said bipolar transistor and ground potential and wherein said video output signal comprises a video output voltage signal taken across said resistor.

6. The circuit of claim 1 wherein said sampling means includes a field effect transistor which is gated on during the blanking interval of said video output signal to produce a sampled black level signal and including means connected to said field effect transistor for storing said sampled black level signal.

7. The circuit of claim 6 wherein said sampled signal comprises a sampled voltage and wherein said storing means includes a capacitor for storing said sampled voltage.

8. The circuit of claim 1 wherein said comparing means includes a differential amplifier and including a source of reference voltage.

9. The circuit of claim 8 wherein said reference voltage source includes means for varying said reference voltage.

10. The circuit of claim 1 wherein said applying means includes means for storing said correction signal and semiconductor switch means connected between said storage means and said input means for applying said correction signal stored by said storing means, to said input signal to correct the black level of said input signal as a function of said correction signal during said blanking interval of said input signal.

11. The circuit of claim 10 wherein said storing means includes a capacitor and wherein said switch means includes a field effect transistor.

12. In apparatus for processing a video signal having a black level blanking interval, a logarithmic amplification circuit comprising:

input means for receiving a video input voltage signal having a black level blanking interval;

means connected to said input means for producing a video input current signal which is linearly related to said video input voltage signal;

logarithmic transfer means connected to said producing means for producing a video output voltage signal which is a logarithmic function of said video input current signal;

means for sampling the black level of said video output voltage signal during the blanking interval thereof to produce a sampled black level voltage;

first means for storing such a sampled voltage;

means for comparing said stored sampled voltage and a reference voltage and for producing a feedback correction voltage signal;

second means for storing said feedback correction voltage; and means for applying said stored correction voltage to said current producing means during the horizontal blanking interval of said video input voltage signal and for correcting the black level of said video input signal as a function of the stored correction voltage.

* * * * *